United States Patent
Ramakrishnan et al.

(10) Patent No.: US 7,952,401 B2
(45) Date of Patent: May 31, 2011

(54) STANDBY CONTROL CIRCUIT AND METHOD

(75) Inventors: Shankar Ramakrishnan, Pondicherry (IN); Kumar Abhishek, Delhi (IN); Ashish Goel, Noida (IN); Ankit Gupta, Ghaziabad (IN); Chandan Gupta, Raipur (IN); Mithlesh Shrivas, Noida (IN); Rahul Sood, Chandigarh (IN)

(73) Assignee: Freescale Semiconductor, Inc., Austin, TX (US)

( * ) Notice: Subject to any disclaimer, the term of this patent is extended or adjusted under 35 U.S.C. 154(b) by 6 days.

(21) Appl. No.: 12/565,775

(22) Filed: Sep. 24, 2009

(65) Prior Publication Data
US 2010/0102865 A1    Apr. 29, 2010

(30) Foreign Application Priority Data
Oct. 24, 2008    (IN) .............................. 2432/DEL/2008

(51) Int. Cl.
*H03L 7/00*    (2006.01)
(52) U.S. Cl. ............................ 327/142; 327/93; 327/198
(58) Field of Classification Search ........................ None
See application file for complete search history.

(56) References Cited

U.S. PATENT DOCUMENTS

| | | | |
|---|---|---|---|
| 4,831,595 A | 5/1989 | Bone | |
| 5,627,492 A | 5/1997 | Weaver et al. | |
| 5,726,607 A * | 3/1998 | Brede et al. | 331/2 |
| 5,903,543 A | 5/1999 | Lee et al. | |
| 7,091,766 B2 | 8/2006 | Ko et al. | |
| 7,142,404 B1 | 11/2006 | Bikulcius et al. | |
| 7,734,970 B2 * | 6/2010 | Drake et al. | 714/726 |
| 2007/0096781 A1 * | 5/2007 | Ito | 327/112 |

* cited by examiner

*Primary Examiner* — Lincoln Donovan
*Assistant Examiner* — Sibin Chen
(74) *Attorney, Agent, or Firm* — Charles Bergere

(57) ABSTRACT

A standby control circuit for an integrated circuit module includes a first control circuit that is responsive, in a normal operating mode of the integrated circuit module, to an asynchronous standby signal indicating a standby mode entry event to output a standby mode signal synchronous with a primary clock signal to indicate a standby operating mode of the integrated circuit module. The standby control circuit also includes a second control circuit which is responsive, in a reduced power mode of the integrated circuit module, to the asynchronous standby signal indicating the standby mode entry event to control the first control circuit to output the standby mode signal synchronous with a secondary clock signal to indicate the standby operating mode.

17 Claims, 13 Drawing Sheets

STANDBY CONTROL CIRCUIT AND METHOD

BACKGROUND OF THE INVENTION

The present invention relates to integrated circuit modules and, in particular, to standby control circuits for activating a standby mode in which a secondary power supply provides power to the integrated circuit module.

Integrated circuits modules are commonly designed with a reduced power operating mode (or an "idle mode") in which selected functional blocks of the integrated circuit module are disabled to reduce static power consumption during periods of little or no activity. A reduced power operating mode may provide an appreciable reduction in static power consumption, particularly in cases where power intensive functional blocks, such as clock generation circuits (such as a phase locked loop), are disabled. In some integrated circuit designs the disabled functional blocks may include a clock generation circuit that generates, in a normal operating mode of the integrated circuit module, a System Clock signal for the integrated circuit module. Hence, in the reduced power operating mode the System Clock may be inactive, and thus not available.

In addition to the normal operating mode and the reduced power operating mode, an integrated circuit module may also be designed to provide a "standby operating mode" that is "entered" in response to activation of a standby signal, which is typically an asynchronous signal.

In the standby mode, a power supply voltage from a primary power supply (such as a 3.3V power supply) may be isolated from all but essential functional blocks required to restore the integrated circuit module to the normal operating mode. In the standby mode, the essential functional blocks may be powered by a secondary power supply, such as a battery, which provides a secondary power supply voltage. In such a case it is important that the load on the battery be minimized to preserve battery life.

In some integrated circuit designs, "entry" into standby mode is managed by a standby control circuit on-board the integrated circuit module. One example of an on-board standby control circuit 100 is shown in FIG. 1. In this example, the asynchronous standby signal 102 is provided to an input of an edge triggered register 104. A clock signal 103 (SYSTEM CLOCK) is provided to a clock input of the register 104 to propagate the asynchronous standby signal 102 to the output 106 of the register 104 synchronous with an edge of the clock signal. An AND 110 gate receives the data output 106 and passes the SYSTEM CLOCK signal as a gated output signal 106 (SYNCH_STBY) having a logical state which depends on the output 106 of the register 104. Hence, the scheme depicted in FIG. 1 is an example of a circuit for isolating a signal (which in this example is the SYSTEM CLOCK signal) in a way that prevents propagation to the SYNCH_STBY signal of "glitches" that may be present on the SYSTEM CLOCK signal when switching to a standby mode (in other words, when the STBY signal goes low).

Unfortunately, in the reduced power mode the SYSTEM CLOCK signal may be inactive, in which case the register 104 will be unable to propagate the asynchronous standby signal 102 to the output 106 of the register 104. In such circumstances, the combinational logic 110 will not isolate the SYSTEM CLOCK signal and thus the SYNCH_STBY signal will be unsuitable for isolating inputs, such as clock, control, and data inputs, to the essential functional blocks, such as a Real Time Clock (RTC). Accordingly, the standby control circuit 100 may not be effective at preventing false activations and deactivations of input signals to the essential functional blocks when the clock signal is inactive which may thus lead to data corruption, unpredictable operation and/or increased power consumption.

It would be advantageous to provide a standby control circuit that is responsive to an asynchronous standby signal irrespective of whether the clock signal is active or inactive. This may be important for integrated circuit modules that provide a reduced power operating mode that disables the clock signal to reduce static power consumption.

It would also be advantageous to provide a standby control circuit that reduces the likelihood of corruption of the timing functions of a real time clock (RTC) during standby mode entry and thus provides for improved robustness and reliability of the RTC.

BRIEF DESCRIPTION OF THE DRAWINGS

The present invention will now be described in relation to preferred embodiments as illustrated in the accompanying drawings. However, it is to be understood that the following description is not to limit the generality of the above description.

DETAILED DESCRIPTION OF THE INVENTION

Figure 1:
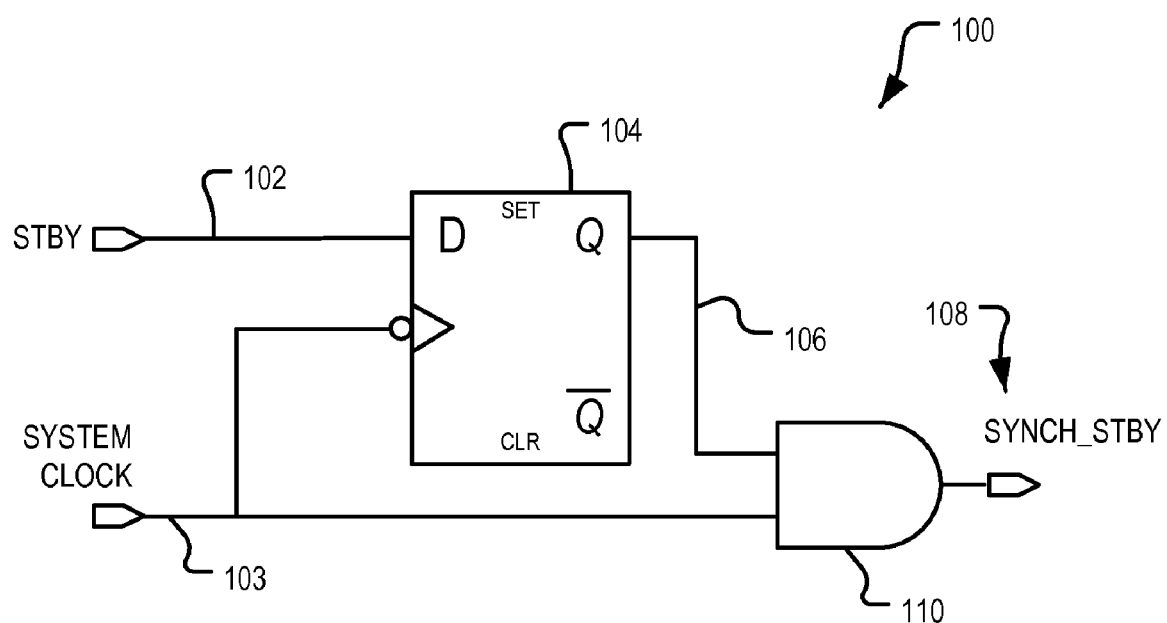
FIG. 1 is a schematic diagram for a prior art standby control circuit.

The following description describes an embodiment in relation to a standby control circuit for incorporating in an integrated circuit module which is operable in either a normal operating mode, a reduced power mode, or a standby operating mode. Assuming that the integrated circuit module uses CMOS technology, the normal operating mode and the reduced power mode are operating modes which are available when a 3.3V primary supply of power is present. The standby mode, on the other hand, will be a mode which is enabled when the 3.3V supply primary of power is not present, in which case a secondary supply of power (such as a battery) supplies power to essential functional blocks of the integrated circuit module.

In one aspect the present invention provides a standby control circuit for an integrated circuit module having a primary clock circuit for providing a primary clock signal that is active in a normal operating mode of the integrated circuit module and inactive in a reduced power mode of the integrated circuit module, and a secondary clock circuit for providing a secondary clock signal independently of the mode of the integrated circuit module. The standby control circuit includes first and second control circuits. The first control circuit is responsive, in the normal operating mode, to an asynchronous standby signal indicating a standby mode entry event to output, synchronous with the primary clock signal, wherein a standby mode signal indicates a standby operating mode of the integrated circuit module. The second control circuit is responsive, in the reduced power mode, to the asynchronous standby signal indicating the standby mode entry event to control the first control circuit to output the standby mode signal synchronous with the secondary clock signal to indicate the standby operating mode.

The first and second control circuits allow the integrated circuit module to reliably switch to (or "enter") a standby mode from either the normal operating mode or the reduced power mode whilst minimising current leakage, irrespective of whether the primary clock signal is active or inactive. The asynchronous standby signal includes a digital signal having one of two logical states indicative of a respective event associated with controlling the standby operating mode of the integrated circuit module. For example, a first logical state may indicate the "standby mode entry event", and a second logical state may indicate a "standby mode exit event".

In this respect, references to the term "logical state" throughout this specification denote a digital logical state, such as a "logic 0" (or "low") state or a "logic 1" (or "high") state. Although the asynchronous standby signal will typically be a digital signal, in some embodiments the asynchronous standby signal may comprise an analogue signal having a signal level (such as a voltage) that is converted into a logical state depending on the signal level. Such a conversion may be performed, for example, using a suitable circuit, such as a Schmitt Trigger or an analogue to digital converter (ADC).

The "standby mode entry event" will normally be associated with the removal of a primary supply of power from the integrated circuit module. In the standby mode, the standby control circuit will receive a supply of power from a secondary supply of power, such as a battery. The "standby mode exit event" will normally be associated with the primary supply of power being returned or restored to the integrated circuit module.

Providing a standby control circuit that controls a standby mode signal responsive to the asynchronous standby signal to facilitate standby mode entry irrespective of whether the primary clock signal is active or inactive may improve the responsiveness of the integrated circuit module when switched to the standby mode from either the normal operating mode or the reduced power mode.

The standby mode signal may be separately gated with one or more inputs to a functional block of the integrated circuit module, such as a Real Time Clock (RTC) circuit, to isolate those inputs during switching to the standby mode. Gating the inputs to the RTC circuit with the standby mode signal may reduce the likelihood of erroneous signal levels on the gated inputs to the RTC in response to a standby entry event, even in circumstances where the primary clock signal is inactive.

The first control circuit may include a first synchronizer circuit comprising one or more edge triggered registers. However, it is preferred that the first synchronizer circuit include at least two registers, arranged as a dual synchronizer circuit, so as to avoid undesirable meta-stable conditions that may otherwise arise in a single register arrangement.

It is preferred that the first synchronizer circuit includes an input (or first) register and an output (or last) register. The input register and the output register may each have a clock input for receiving the primary clock signal, an input for registering an input signal on an edge of the primary clock signal, and an output having a logical state depending on the registered input signal, the output of the output register being the standby mode signal.

The first synchronizer circuit may be arranged to output the standby mode signal indicating a standby operating mode within a predetermined delay of the asynchronous standby signal indicating the standby mode entry event. It is preferred that the predetermined delay be less than a decay time associated with the supply voltage of the primary supply of power being removed, being the decay time for the output voltage of the primary supply of power to decrease from a minimum threshold voltage value representing a "logic 1" state to a maximum threshold voltage value representing a "logic 0" state.

The registers of the first synchronizer circuit will preferably be arranged so that the input signal registered by the input register propagates to the output of the output register when the primary clock signal is active. In an embodiment that includes two registers, the input signal at the input to the input register will register at the output of the output register after at least two clock edges of the primary clock signal. The at least two clock edges are preferably consecutive clock edges comprising a rising edge and a falling edge. As explained above, the output of the output register will correspond with the standby mode signal.

Providing a first control circuit comprising an input and output register arranged to register respective input signals on consecutive edges of the primary clock signal may assist in reducing the delay in propagating the input signal registered at the input register to the output of the output register whilst maintaining the data integrity of the output of the first synchronizer circuit, and thus the standby mode signal, so as to avoid a meta-stable output.

A reduced delay may further improve the responsiveness of the of standby control circuit and thus, in the above described gated configuration, reduce the likelihood of the inputs to the RTC having an indeterminate (or "floating") state and so prevent corruption of the integrity of the RTC operation or an undesirable current leakage.

The at least two registers of the first synchronizer circuit may each include an asynchronous input for asynchronously controlling the logical state of the respective register outputs independently of the primary clock signal. Preferably the asynchronous input is a reset or set input for asynchronously setting or resetting the register outputs. The asynchronous inputs may be coupled to an output of the second control circuit to permit the second control circuit to control, when the primary clock signal is inactive, the standby mode signal synchronous with the secondary clock signal in response to the standby mode entry event.

The second control circuit may include a second synchronizer circuit comprising an arrangement of at least two edge triggered registers. The arrangement of at least two registers will preferably comprise at least one input (or first) register and at least one output (or second) register.

Each register of the second control circuit will preferably include a clock input for receiving the secondary clock signal, an input for registering an input signal on an edge of the clock signal, and an output having a logical state depending on the registered input signal. The one or more input registers of the second synchronizer circuit will receive the asynchronous standby signal as the input signal.

The input and output register(s) of the second synchronizer circuit may be arranged so that the input signal registered by the input register(s) is propagated to the output of the output register(s) in response to the standby mode entry event, when the integrated circuit module is operating in the reduced power mode.

In one embodiment, the input and output register(s) of the second synchronizer circuit are arranged so that the input signal at the input of the input register(s) registers at an output of at least one of the output register(s) of the second synchronizer circuit within two clock edges of the secondary clock signal. The at least two clock edges may be consecutive clock edges comprising a rising edge and a falling edge, or a falling edge and a rising edge.

The registers of the first or second control circuit may include any suitable type of register. In one embodiment the first and second counters are edge triggered D-type flip flops.

The present invention also provides an integrated circuit module including first and second inputs. The first input receives a first output voltage supply from a primary supply of power and the second input for receives a second output voltage supply from a secondary supply of power. A detector receives the first input and generates an asynchronous standby signal in response to the first output voltage supply being removed from the integrated circuit module. The asynchronous standby signal indicates a standby mode entry event. A primary clock circuit provides a primary clock signal that is active in a normal operating mode of the integrated circuit module and inactive in a reduced power mode of the integrated circuit module. A secondary clock circuit provides a secondary clock signal independent of the mode of the integrated circuit module.

A standby control circuit includes first and second control circuits. The first control circuit is responsive, in the normal operating mode, to the asynchronous standby signal to control a standby mode signal synchronous with the primary clock signal to indicate a standby operating mode of the integrated circuit module. The second control circuit is responsive, in the reduced power mode, to the asynchronous standby signal to control the first control circuit to control the standby mode signal synchronous with the secondary clock signal to indicate the standby operating mode.

The present invention also provides a method of providing a signal indicating a standby mode of an operating mode an integrated circuit module having a primary clock circuit for providing a primary clock signal that is active in a normal operating mode of the integrated circuit module and inactive in a reduced power mode of the integrated circuit module, and a secondary clock circuit for providing a secondary clock signal independently of the mode of the integrated circuit module. The method includes:

receiving an asynchronous standby signal indicating a standby mode entry event;

providing a first control circuit responsive, in the normal operating mode, to the asynchronous standby signal to output, synchronous with the primary clock signal, a standby mode signal indicating a standby operating mode of the integrated circuit module; and providing a second control circuit responsive, in the reduced power mode, to the asynchronous standby signal to control the first control circuit to output the standby mode signal synchronous with the secondary clock signal to indicate the standby operating mode.

Figure 2:
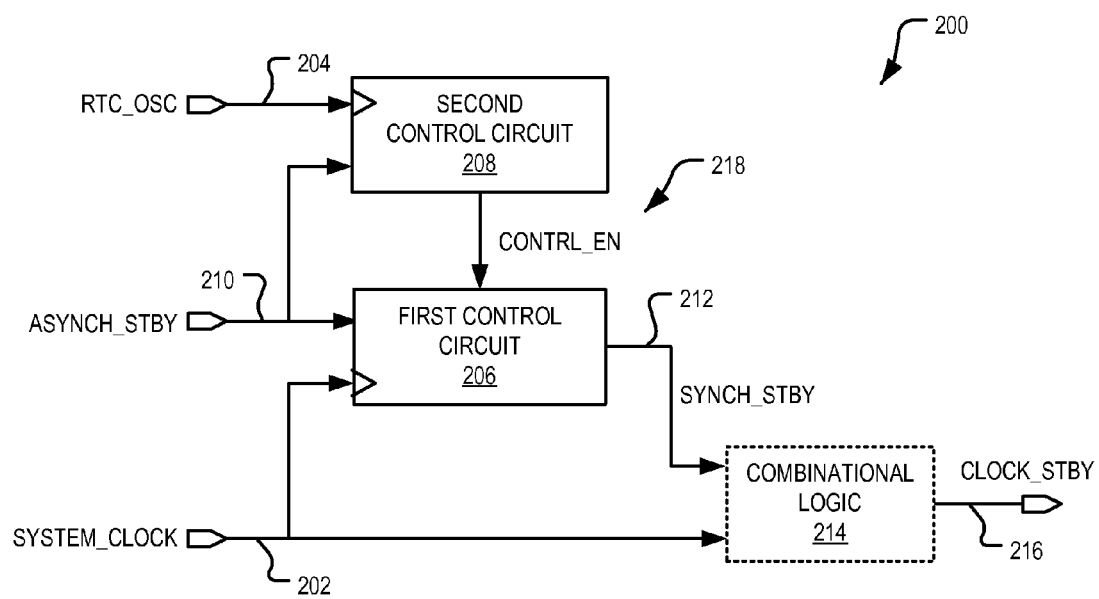
FIG. 2 is a block diagram of a standby control circuit according to an embodiment of the present invention.

Referring now to FIG. 2 there is shown a block diagram for a standby control circuit 200 suitable for an integrated circuit module having a primary clock circuit for providing a primary clock signal 202 (shown as SYSTEM_CLOCK) in the normal operating mode and a secondary clock circuit for providing a secondary clock signal 204 (shown as RTC_OSC) independently of the operation mode of the integrated circuit module. In other words, the secondary clock signal 204 will normally be available in either the normal operating mode, the reduced power mode, or the standby operating mode. In the present example the RTC_OSC signal is a 32 KHz clock provided by an oscillator (not shown).

The SYSTEM_CLOCK signal is active in the normal operating mode of the integrated circuit module and inactive in the reduced power mode of the integrated circuit module. The SYSTEM_CLOCK may be provided by, for example, by a phase locked loop (PLL) circuit as a free running clock having a clock frequency which is greater than the clock frequency of the secondary clock signal. The frequency of the SYSTEM_CLOCK signal may be, for example, a 40 MHz clock signal. However, it will be appreciated a 40 MHz clock frequency is exemplary only, and the present invention will be applicable other primary clock signal frequencies higher than the frequency of the secondary clock signal.

As will be described herein, the standby control circuit 200 is responsive to the asynchronous standby signal 210 (ASYNCH_STBY) to output a standby mode signal 212 (SYNCH_STBY) having a logical state representing the status of the standby operating mode of the integrated circuit module. The status may include, for example, a "standby mode enabled" status indicative of the standby mode being enabled (or entered), and a "standby mode disabled" status indicative of the standby mode being disabled (or exited).

The standby control circuit 200 is capable of generating the SYNCH_STBY signal irrespective of the status of the SYSTEM_CLOCK signal, and in particular, irrespective of whether the SYSTEM_CLOCK signal is active or inactive. Consequently, the standby control circuit 200 is capable of generating the SYNCH_STBY signal irrespective of whether the integrated circuit module is operating in the normal operating mode or the reduced power mode.

As shown in FIG. 2, the standby control circuit 200 includes a first control circuit 206 and a second control circuit 208.

The operation of the first control circuit 206 and the second control circuit 208 of the standby control circuit 200 depends on the operation mode of the integrated circuit module. In the normal operating mode, the first control circuit 206 is responsive to the ASYNCH_STBY signal to output the SYNCH_STBY signal synchronous with the SYSTEM_CLOCK signal. On the other hand, in the reduced power mode, the second control circuit 208 is responsive to the ASYNCH_STBY signal to control the first control circuit 206 to output the SYNCH_STBY signal synchronous with the RTC_OSC signal.

In the embodiment illustrated in FIG. 2, the second control circuit 208 controls the first control circuit 206 by way of a logical output signal 218 (CNTRL_EN) which is capable of controlling the logical state of the SYNCH_STBY signal. In the embodiment illustrated, the control causes the first control circuit 206 to assert the SYNCH_STBY signal (as a low logical state) synchronous with the RTC_OSC signal in response to the ASYNCH_STBY signal indicating a "standby mode entry event".

Figure 3:
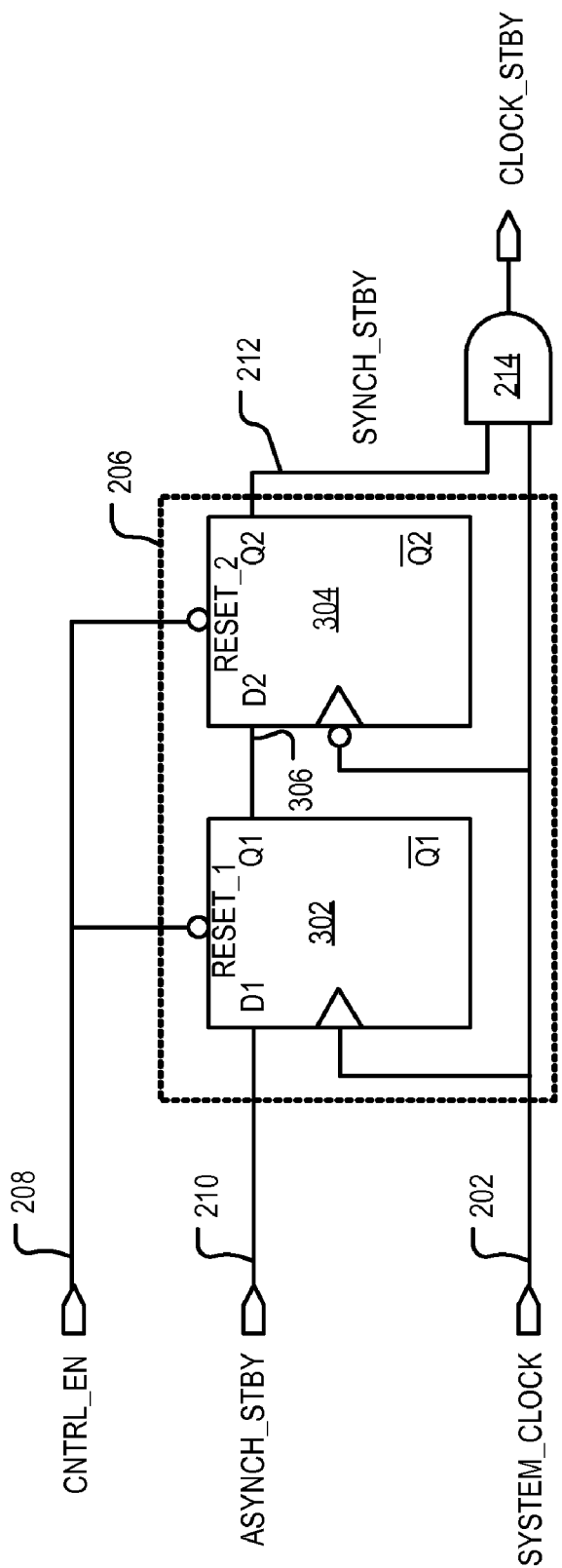
FIG. 3 is a schematic diagram of an embodiment of a first control circuit suitable for incorporating in the standby control circuit of FIG. 2.

In the embodiment illustrated in FIG. 3, the ASYNCH_STBY signal is provided by a voltage regulator module (not shown) output signal which is "low" when the primary supply of power (not shown) is not present. Thus, in the present example the "standby mode entry event" is indicated by a logical state of the ASYNCH_STBY signal, which in this example is a "logical 0" (or logical "low") state. On the other hand, when the power supply of power is present, the ASYNCH_STBY signal will have a logical state representing a "standby mode exit event", which in this example is indicated by a "logical 1" (or logical "high") state.

As shown, in the illustrated embodiment combinational logic 214 (shown dashed) receives the SYNCH_STBY signal and gates that signal with the SYSTEM_CLOCK signal. In the present case, the combinational logic 214 includes an AND gate which "passes" the SYSTEM_CLOCK signal as the CLOCK_STBY signal 216 when the ASYNCH_STBY signal is "high" (that is "logical "1") or provides a "low" output as the CLOCK_STBY signal 216 when the ASYNCH_ STBY signal is "low" (that is, a logical "0). In other words, the CLOCK_STBY signal will track the SYSTEM_CLOCK signal whenever the ASYNCH_STBY signal is indicative of the "standby mode exit event", and isolate the CLOCK_ STBY signal from the SYSTEM_CLOCK signal whenever the ASYNCH_STBY signal is indicative of the "standby mode entry event". Gating the SYSTEM_CLOCK signal in this way isolates the SYSTEM_CLOCK signal from the output of the AND gate 214 when the SYNCH_STBY signal is asserted (low). Although in the present example the AND gate 214 receives, and gates, the SYSTEM_CLOCK signal with the SYNCH_STBY signal, it will be appreciated that this is exemplary and other embodiments of the present invention may gate the SYNCH_STBY signal with a different signal so as to isolate the different signal from the output of the AND gate 214 when the SYNCH_STBY signal is asserted (low).

In one embodiment, the CLOCK_STBY signal is provided to the RTC as a clock input. Gating the RTC clock signal in this way may prevent CLOCK_STBY, and thus the RTC clock input, from having an indeterminate (or "floating") logical level during switching to standby mode from the normal operating mode, and thus also prevent glitches appearing on the RTC clock input during mode switching. In this respect, when switching from the normal operating mode to the standby operating mode (and thus when switching from the primary supply of power to the secondary supply of power), the SYNCH_STBY signal will be asserted (low) within a time period during which the amplitude of the SYSTEM_CLOCK is substantially maintained, despite the primary supply of power not being present. A similar gating scheme may be used for other inputs to the RTC.

As previously explained, the "standby mode exit event" is indicated when the primary supply of power is present, or returns. On the other hand, the "standby mode entry event" is indicated in response to an event associated with switching from the primary supply of power to the secondary supply of power, and thus when the primary supply of power is not present or removed.

The "standby mode entry event" may be indicated either in the normal operating mode when the SYSTEM_CLOCK signal is active, or in the reduced power mode when the SYSTEM_CLOCK signal is inactive.

From the above explanation it will be understood that indication of the "standby mode entry event", when the integrated circuit module is operating in the normal operating mode, annunciates a change in the activity status of the SYSTEM_CLOCK signal from active to inactive. The change in the activity status results from the removal of the primary supply of power from the clock generation circuits (such as a PLL), as well as the other circuits of the integrated circuit module, which causes the SYSTEM_CLOCK signal to go inactive after a period.

On the other hand, in the reduced power mode the SYSTEM_CLOCK signal is already inactive, even though primary supply of power is present. Hence, activation of the enable standby condition in the reduced power mode does not annunciate a change in the activity status of the SYSTEM_CLOCK signal.

FIG. 3 is a schematic diagram of a sub-circuit of the control circuit 200 depicted in FIG. 2 and which includes a first control circuit 206 according to an embodiment.

In the embodiment illustrated in FIG. 3, the first control circuit 206 comprises a first synchronizer circuit including an input (or first) register 302 and an output (or second) register 304. The input register 302 and the output register 304 are shown as edge triggered D-type flip flops. It will of course be appreciated that other types of edge triggered registers may be used. In the present example, the input register 302 is a positive edge triggered D-type flip flop with an asynchronous reset input (RESET 1), and the output register is a negative-edge triggered D-type flip flop with an asynchronous reset input (RESET 2). As will be explained in more detail following, in some embodiments the choice and arrangement of the edge-triggered registers may depend on the active edge of the RTC clock.

The input register 302 and the output register 304 each receive the SYSTEM_CLOCK signal as a clock input. The ASYNCH_STBY signal is provided to the input (D1) of the input register 302. The CNTRL_EN signal from the second control circuit 208 (ref. FIG. 2) is provided to the asynchronous reset input (RESET_1, RESET_2) of the input register 302 and the output register 304.

The input register 302 registers at its output (Q1) the state of the ASYNCH_STBY signal at its input (D1) on each rising edge of the SYSTEM_CLOCK signal.

In the illustrated arrangement, the input register 302 and the output register 304 are arranged so that the logical state of the ASYNCH_STBY signal registered at the output (Q1) of the input register 302 passes to the output (Q2) of the output register 304 on the falling edge of the SYSTEM CLOCK. Hence, in this scheme the SYNCH_STBY signal is asserted on the falling edge of the SYSTEM_CLOCK signal. A scheme that asserts the SYNCH_STBY signal synchronous with the falling edge of the SYSTEM_CLOCK signal may be preferred in embodiments in which the RTC is triggered on the rising edge of the CLOCK_STBY signal since it will prevent changes to the SYNCH_STBY signal during the active clock edge of the RTC clock signal which may otherwise corrupt the RTC. Of course, in embodiments in which the RTC employs an active-low clock input, the output register 304 may be a rising-edge triggered register.

Figure 4A:
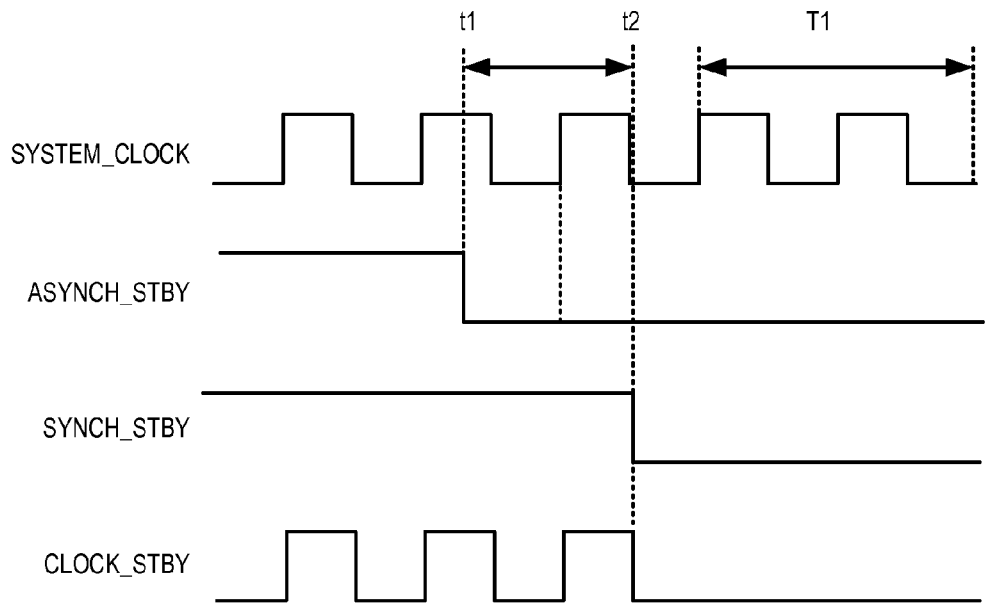
FIG. 4A is a timing diagram illustrating an example of timing relationships between signals of the first control circuit of FIG. 3, when the primary clock signal is active.
Figure 4B:
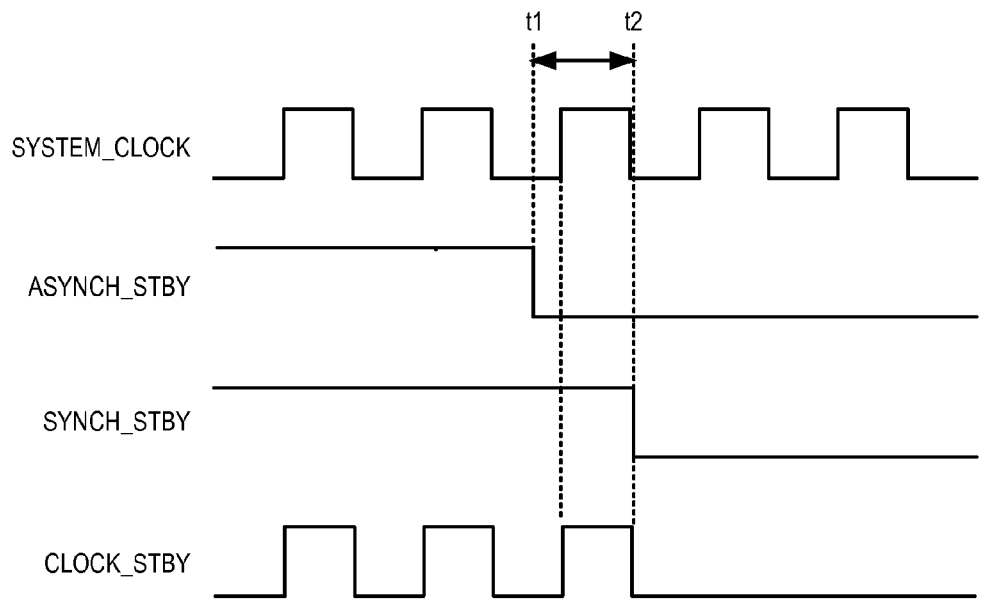
FIG. 4B is a timing diagram illustrating an example of timing relationships between signals of the first control circuit of FIG. 3, when the primary clock signal is active.

FIGS. 4A and 4B depict timing diagrams for the first control circuit 206 illustrated in FIG. 3 in response to assertion of the ASYNCH_STBY signal, which in this example is an active low signal, when the SYSTEM_CLOCK signal is active. In other words, FIG. 4A and FIG. 4B depict timing diagrams which apply when the integrated circuit module is operating in the normal operating mode and the ASYNCH_STBY signal (low) is asserted to indicate a "standby mode entry event".

In FIGS. 4A and 4B, the falling edge representing assertion of the ASYNCH_STBY signal (at time "t1") will register as the SYNCH_STBY signal (at time "t2") within a delay period (t2–t1) which is less than the period (T1) of two clock cycles of the SYSTEM_CLOCK, irrespective of the precise timing relationship between assertion of the ASYNCH_STBY signal and the falling edge of the SYSTEM_CLOCK signal. Hence, and with reference again to FIG. 3, the falling edge of the ASYNCH_STBY signal at the input (D1) to the input register 302 will register at the output (Q2) of the output register 304 as the SYNCH_STBY signal 212 after a minimum of two clock edges of the SYSTEM_CLOCK signal 202, and a maximum of three.

In the embodiment illustrated in FIG. 3, the use of oppositely triggered input 302 and output 304 registers means that the two clock edges responsible for registering the ASYNCH_STBY signal input to the input (D1) of the input register 302, as the SYNCH_STBY signal at the output (Q2) of the output register 304 include consecutive clock edges of the SYSTEM_CLOCK, comprising a rising edge followed by a falling edge.

Providing a first control circuit 206 comprising a pair of edge triggered registers 302, 304 arranged to register respective inputs (D1, D2) on consecutive edges of the SYSTEM_CLOCK signal prevents a meta-stable output condition at the output (Q2) of the second register 304 when the active edge of the SYSTEM_CLOCK signal 202 coincides with the assertion of the ASYNCH_STBY signal at the input register 302. Providing oppositely edge triggered registers may also reduce the propagation delay associated (t2–t1) in registering the input (D1) to input register 302 as the output (Q2) of output register 304 for a dual register configuration.

As shown in FIG. 3, the input register 302 and output register 304 of the first synchronizer circuit each include an asynchronous reset input (RESET_1, RESET_2) for asynchronously controlling the logical state of the respective data outputs (Q1, Q2) independently of the SYSTEM_CLOCK signal.

In the embodiment illustrated, the asynchronous inputs include (RESET_1, RESET_2) reset inputs for asynchronously resetting the outputs of the input 302 and output 304 registers.

Figure 5:
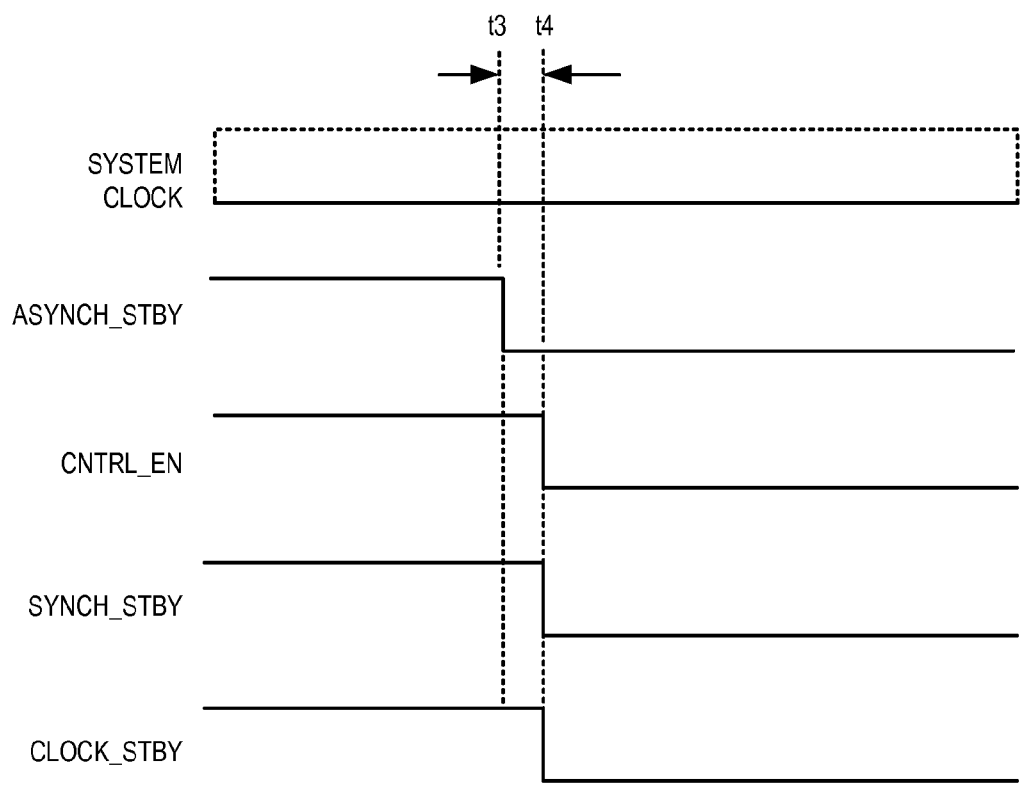
FIG. 5 is a timing diagram illustrating an example of timing relationships between signals of the first control circuit of FIG. 3, when the primary clock signal is inactive.

As shown in FIG. 3, the asynchronous inputs (RESET_1, RESET_2) are coupled to the CNTRL_EN output signal of the second control circuit 208 (ref. FIG. 2) to permit the second control circuit 208 to control, when the SYSTEM_CLOCK signal is inactive, the first control circuit 206 to assert the SYNCH_STBY signal synchronous with the RTC_OSC signal. Referring now to FIG. 5 there is shown timing diagrams depicting a sequence for asserting the SYNCH_STBY signal synchronous with the RTC_OSC signal (ref. FIG. 2) when the SYSTEM_CLOCK is inactive, in response to the ASYNCH_STBY signal indicating a "standby mode entry event". As shown, the falling edge representing assertion of the ASYNCH_STBY signal (at time "t3") will register as the SYNCH_STBY signal (at time "t4") within a time period (t4–t3). For normal operation it is preferred that the potential minimum time period (t4–t3) be greater than the potential maximum time period (t2–t1) (ref. FIGS. 4A and 4B) associated with asserting the SYNCH_STBY signal synchronous with the SYSTEM_CLOCK signal when the SYSTEM_CLOCK signal is active. A more detailed explanation of the operation of the second control circuit 208, and the timing interrelationship between the ASYNCH_STBY, the RTC_OSC signal and the SYNCH_STBY signal will be provided later.

Figure 6:
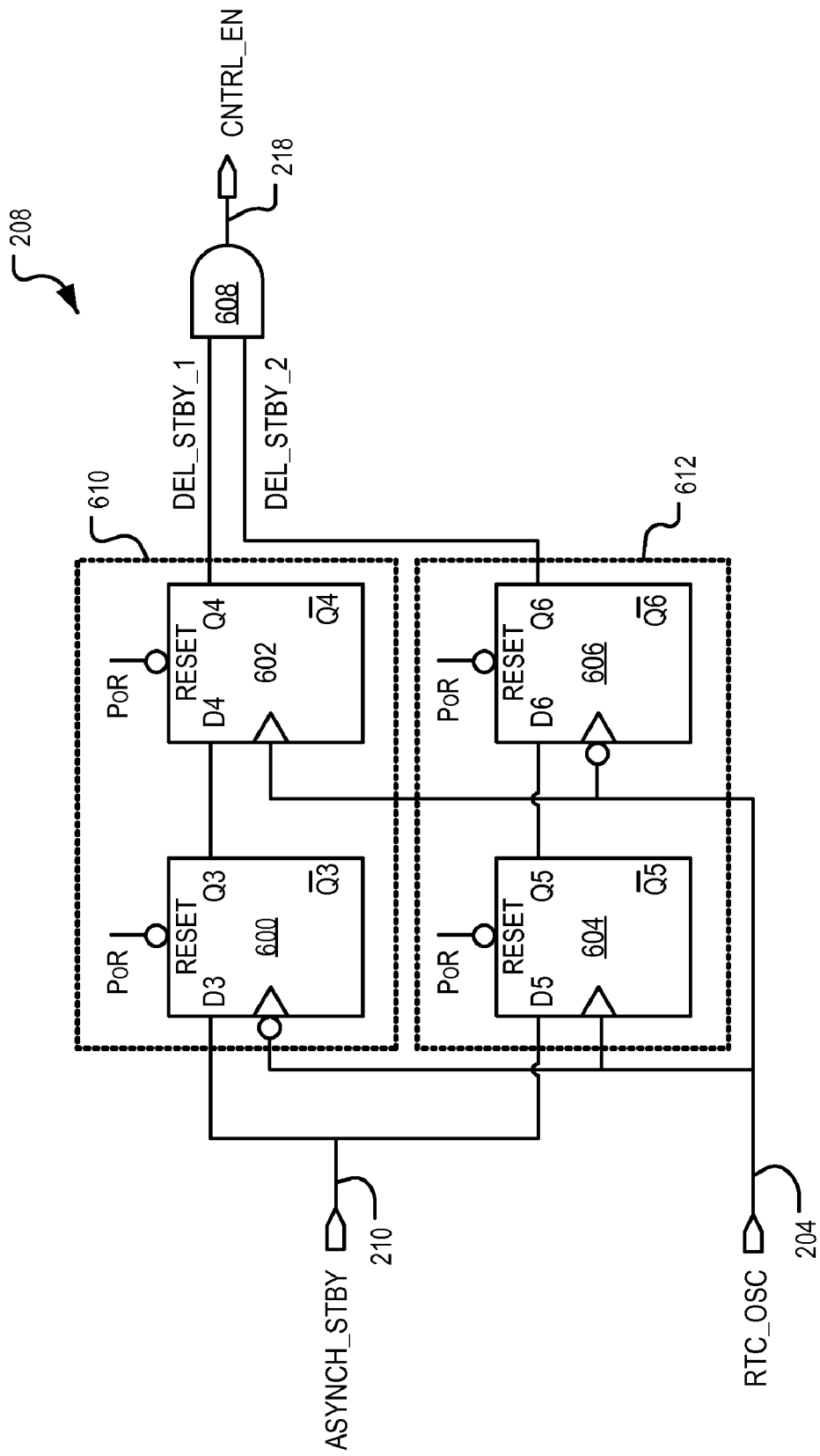
FIG. 6 is a schematic diagram of an embodiment of a second control circuit suitable for incorporating in the standby control circuit of FIG. 2.

With reference now to FIG. 6 there is shown a schematic diagram for an embodiment of the second control circuit 208. The illustrated second control circuit 208 includes a bank of edge triggered registers comprising input registers 600, 604 and output registers 602, 606. In the present case the registers 600, 602, 604, 606 are shown as D-Type flip-flops with an asynchronous reset (RESET).

Each register 600, 602, 604, 606 receives the RTC_OSC signal as a clock input. However, registers 600, 602 are negatively edge triggered, whereas registers 602, 604 are positively edge triggered. Although the illustrated second control circuit 208 includes D-Type flip-flops, it will be appreciated that other types of registers may be used.

The input registers 600, 604 are coupled with a respective output register 602, 606 to provide two synchronizer circuits 610, 612 which are similar in arrangement and operation to the first synchronizer circuit described in relation to the first control circuit 206 (FIG. 3). For the remainder of this description, the synchronizer circuit comprising the input register 600 and the output register 602 will be referred to as the "second synchronizer circuit" 610, and the synchronizer circuit comprising the input register 604 and the output register 606 will be referred to as the "third synchronizer circuit" 612.

The second synchronizer circuit 610 has an associated input (D3) and provides an associated output (Q4). The third synchronizer circuit 612 also has an associated input (D5) and provides an associated output (Q6).

As described previously, each register 600, 602, 604, 606 of the second control circuit 208 includes a clock input for receiving the RTC_OSC signal. However, registers 600, 606 are negatively edge triggered, whereas registers 602, 604 are positively edge triggered. The respective outputs (Q4, Q6) of the second synchronizer circuit 610 and the third synchronizer circuit 612 are coupled to an AND gate 608 so that the logical state of the CNTRL_EN signal depends on the outputs (Q4, Q6) of the second synchronizer circuit 610 and the third synchronizer circuit 612. In particular, the output (Q4) of the output register 602 and the output (Q6) of the output register 606 are provided as inputs (DEL_ASYNCH_STBY_1, DEL_ASYNCH_STBY_2) to the AND gate 608 so that the CNTRL_EN signal is asserted (low) whenever either DEL_ASYNCH_STBY_1 or DEL_ASYNCH_STBY_2 is low.

Figure 7A:
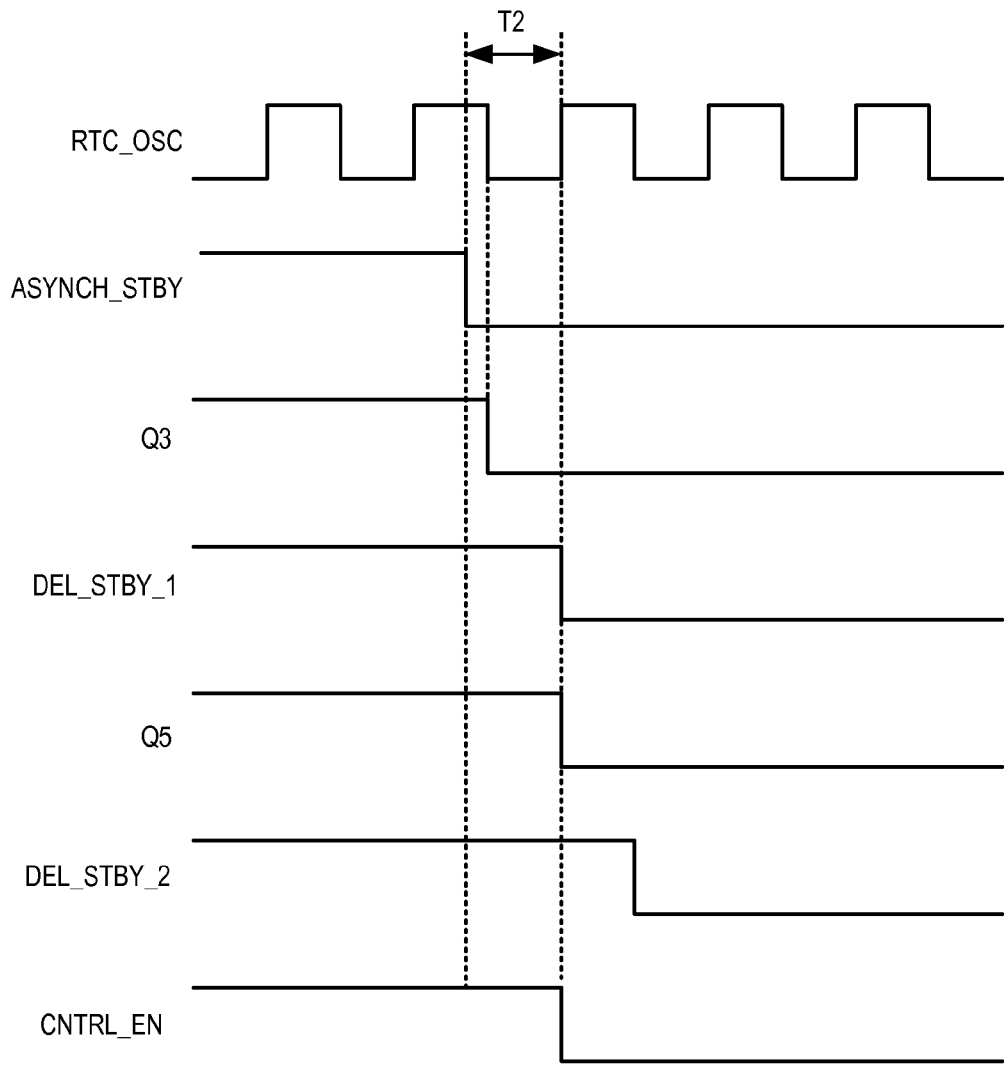
FIG. 7A is a timing diagram illustrating an example of timing relationships between signals of the second control circuit of FIG. 6.
Figure 7B:
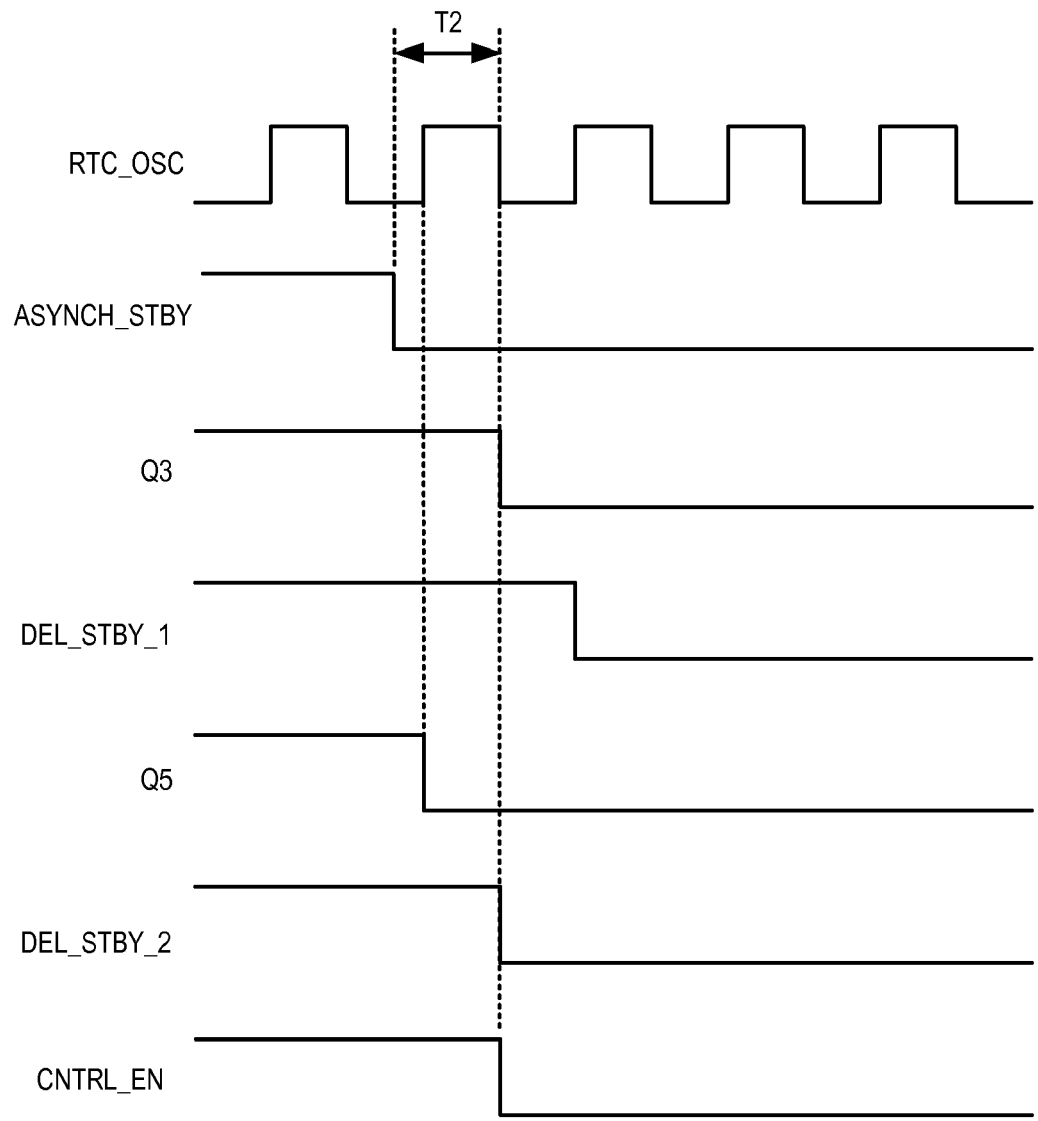
FIG. 7B is a timing diagram illustrating another example of timing relationships between signals of the second control circuit of FIG. 6.

In the illustrated configuration, and as shown in FIGS. 7A and 7B, a high-to-low transition of the ASYNCH_STBY signal 210 will register at either the DEL_ASYNCH_STBY_1 or DEL_ASYNCH_STBY_2 input within a period (T2) of less than one clock cycle of the RTC_OSC signal, irrespective of the timing relationship between the RTC_OSC signal and the ASYNCH_STBY signal. Thus, in the illustrated arrangement the CNTRL_EN signal will be asserted within one clock cycle of the RTC_OSC signal in response to the high-to-low transition of the ASYNCH_STBY signal. Thus, for example, assuming that the RTC_OSC signal is a 32 KHz signal, the CNTRL_EN signal will be asserted after a delay of about 31.25 μS of a rising or falling edge of the RTC_OSC signal.

Careful consideration may need to be given to the delay of the second synchronizer circuit 610 to ensure that the potential minimum delay is greater than the potential maximum delay of the first synchronizer circuit 206 (to ensure that the first control circuit is the circuit responsible for asserting the ASYNCH_STBY signal, when the SYSTEM_CLOCK is active), but less than the decay time of the main supply of power voltage to decrease to a level which may permit indeterminate states to enter the RTC inputs.

In some embodiments it may be necessary to measure the decay time of the primary supply of power. As will be appreciated, the actual decay time will depend on inherent properties, such as capacitance and the like, of the load presented to the main supply of power by the integrated circuit and other components.

In 3.3V, 0.25 μm CMOS technology, it may be necessary to measure the decay time from 3.3V to 1.1V and then select the frequency of the clock provided to the second synchronizer circuit 610 accordingly. A response time of 31.25115 is more than adequate for a decay time of 150 μS to 200 μS.

Returning briefly to FIG. 3, as explained above, asserting the CNTRL_EN signal low will reset the registers 302, 302 of the first control circuit and thus cause the SYNCH_STBY signal and the CLOCK_STBY signal to go low. When the CLOCK_STBY signal is gated with inputs signals to the RTC using isolation logic, the RTC inputs receiving a gated output will also be low, which will thus prevent the RTC inputs from having an indeterminate state (or "floating") during switching from reduced power mode to standby mode. As will be appreciated, floating inputs may have undesirable consequences such as increased leakage current and corruption of RTC integrity.

It is not essential that the second control circuit 208 include two dual synchronizer circuits 610, 612, since in some embodiments a single dual synchronizer circuit, or appropriate clock frequency selection, may provide an appropriate delay. However, a second control circuit 208 that includes two dual synchronizer circuits is preferred since it provides for more predictable control of the delay between activation of the ASYNCH_STBY signal and activation of CNTRL_EN signal since the CNTRL_EN signal may be asserted with respect to either a consecutive falling and rising edge of the RTC_OSC signal (ref. FIG. 7A) or on a consecutive rising and falling edge of the RTC_OSC signal (ref. FIG. 7B).

More predictable control may improve the responsiveness of the standby circuit 200 to the activation of the ASYNCH_STBY signal when the primary clock is inactive, and thus when the integrated circuit module is operating in reduced power mode.

In view of the above description, it will be appreciated that the standby control circuit 200 depicted in FIG. 2 may be able to assert the SYNCH_STBY signal irrespective of the status of the SYSTEM_CLOCK and thus isolate the inputs to the RTC when switching from either the normal operating mode or the reduced power mode to the standby mode.

An embodiment of the standby control circuit 200 may include additional circuit elements for restoring the integrated circuit module from the standby mode. For example, FIG. 8 shows a circuit diagram of an embodiment of the first control circuit 206 which interfaces with logic elements 800, 802, 804, 806, 808.

Figure 8:
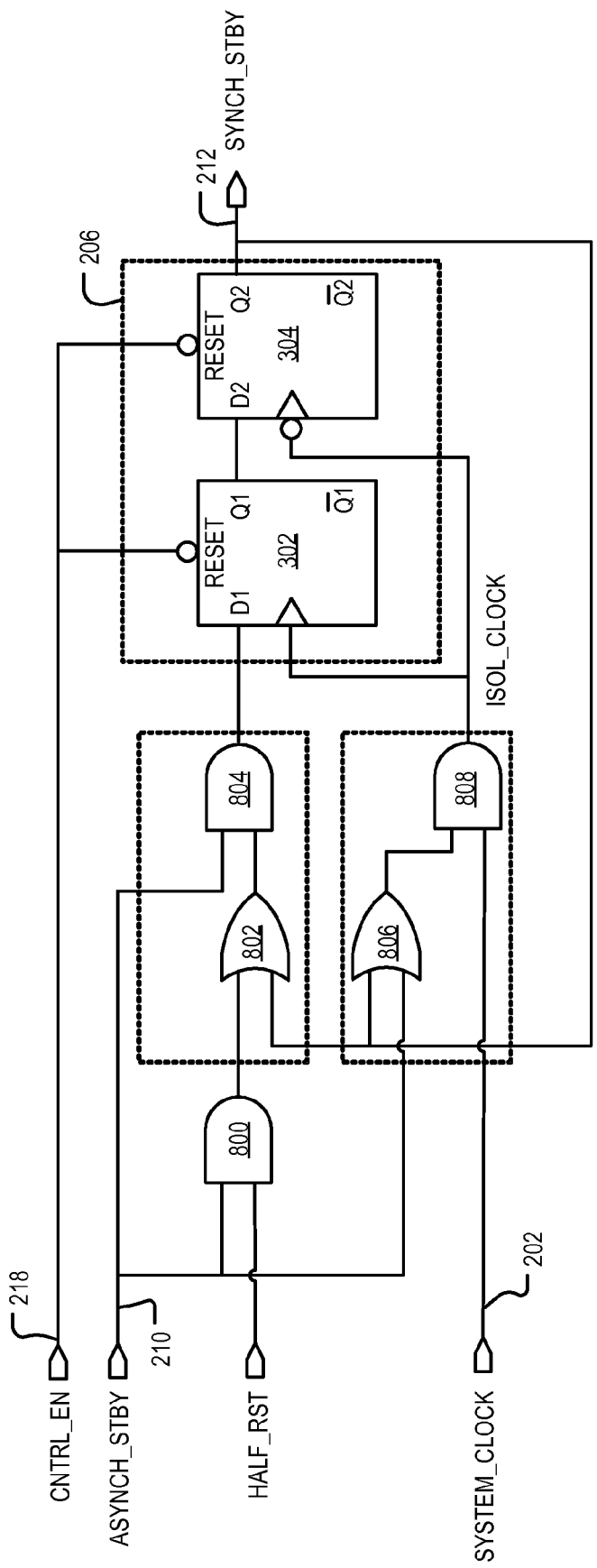
FIG. 8 is a schematic diagram of another first control circuit suitable for incorporating in the standby control circuit of FIG. 1.

The circuit illustrated in FIG. 8 is capable of restoring the integrated circuit module to normal operating mode when the primary supply of power is returned. For ease of understanding, the operation of the circuit will now be described in relation to the following examples which relate to standby mode exit (Example 1) and standby mode entry (Example 2).

EXAMPLE 1

Standby Mode Exit

Figure 9A:
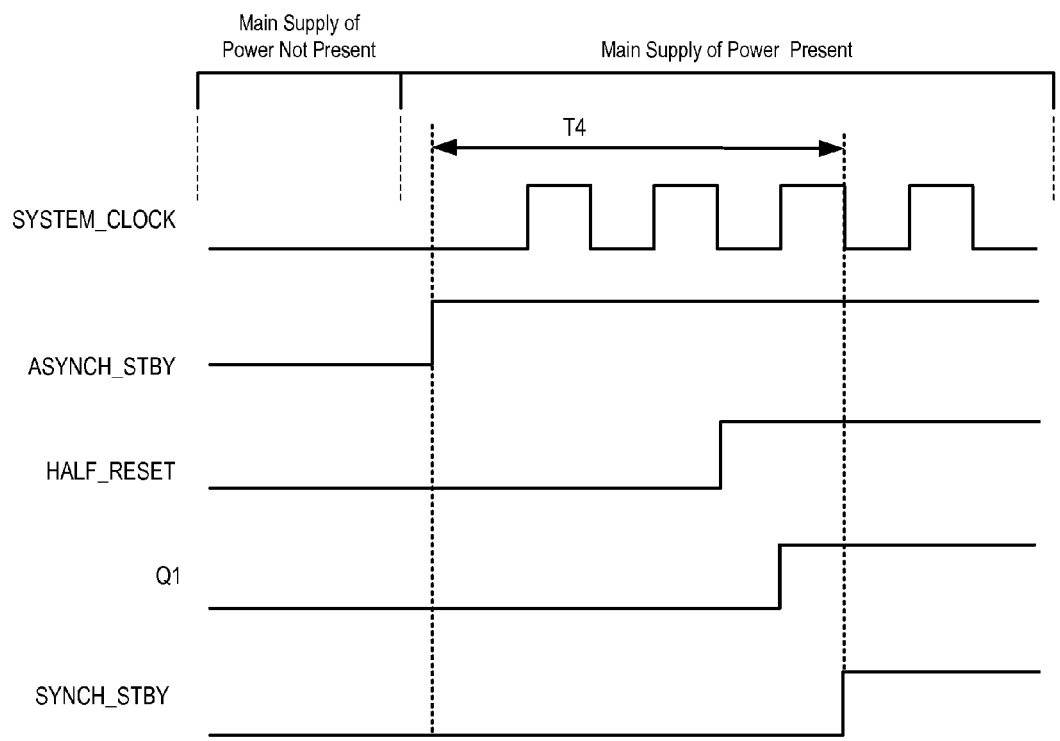
FIG. 9A is a timing diagram illustrating an example of timing relationships between signals of the second control circuit of FIG. 8.

With reference to FIG. 8 and FIG. 9A, prior to the primary supply of power returning, the ASYNCH_STBY signal and the SYNCH_STBY signal will be low. In that condition, the inputs to the two-input OR gate 806 are both low, and thus the SYSTEM_CLOCK signal is isolated from the clock inputs to the input register 302 and the output register 304 by the action of the AND gate 808.

On return of the primary supply of power, and after the SYSTEM_CLOCK signal, the HALF_RST and input signals to the RTC have a reset state, the ASYNCH_STBY signal is de-asserted (that is, it goes high) by the voltage regulator (not shown). However, the AND gate 804 is disabled from passing the ASYNCH_STBY signal to the input (D1) of the input register 302 until after the HALF_RST signal is also high. In this way, de-assertion of the SYNCH_STBY signal is delayed by a time period (T4) in response to the ASYNCH_STBY signal going high (and thus being indicative of a "standby mode exit event" condition), to maintain isolation of the RTC inputs until after the SYSTEM_CLOCK, and other signals of the integrated circuit module, have stabilised.

Two events occur following the HALF_RST signal going high. First, the output of the two-input AND gate 800 also goes high. A high on the output of the two-input AND gate 800 passes to an input of the two-input AND gate 804 via two-input OR gate 802 to enable the output of the AND gate 804 to pass the ASYNCH_STBY signal to the input (D1) of the input register 302. Second, the output of the AND gate 808 is enabled via the OR gate 806 so that the SYSTEM_CLOCK is passed to the clock inputs of the input register 302 and the output register 304.

The "high" ASYNCH_STBY is signal is registered at the output (Q1) of the input register 302 synchronous with the first rising edge of the SYSTEM_CLOCK after the ASYNCH_STBY signal has passed to the input (D1) of the input register 302. On the next edge of the SYSTEM_CLOCK signal, being a falling edge, the ASYNCH_STBY signal is passed to the output of the output register 304 and registered as the standby mode signal, as indicated by the SYNCH_STBY going from low to high.

EXAMPLE 2

Standby Mode Entry (SYSTEM_CLOCK ACTIVE)

Figure 9B:
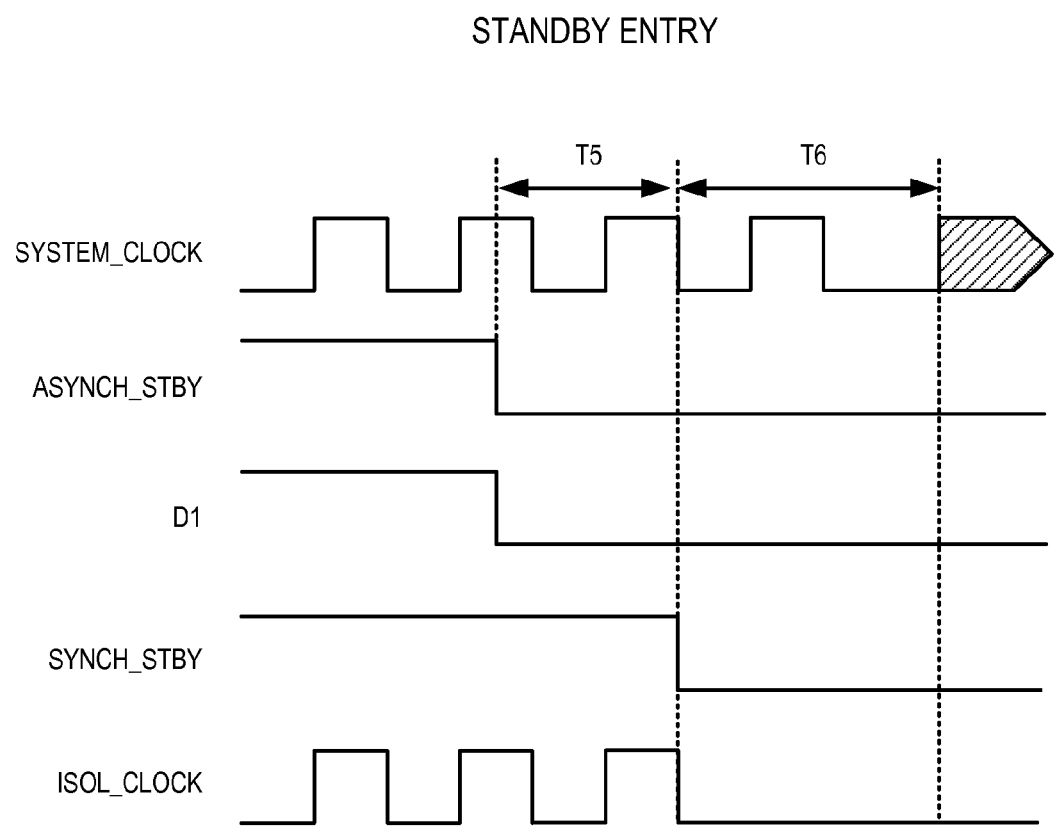
FIG. 9B is another timing diagram illustrating example of timing relationships between signals of the second control circuit of FIG. 8.

With reference to FIGS. 8 and 9B, prior to the primary supply of power being removed, the HALF_RST signal, the ASYNCH_STBY signal, the SYNCH_STBY signal will each be high. In that condition, one input to each of the two-input OR gates 802, 806 will be high, thus enabling respective AND gates 804, 808 to pass the ASYNCH_STBY signal and the SYSTEM_CLOCK signal respectively.

On removal of the primary supply of power, the ASYNCH_STBY signal is asserted (that is, it goes low) by the voltage regulator (not shown). Because the two-input AND gate 804 has, at that point, a high on its other input (via OR gate 802), assertion of the ASYNCH_STBY signal causes the output of the AND gate 804, and thus the input (D1) to input register 302 to go low. Since the clock input is present at the input register 302 and the output register 304, the "low" ASYNCH_STBY signal is registered at the output (Q1) of the input register 302 synchronous with the first rising edge of the SYSTEM_CLOCK after the ASYNCH_STBY signal has passed to the input (D1) of the input register 302. On the next edge of the SYSTEM_CLOCK signal, being a falling edge, the ASYNCH_STBY signal is passed to the output of the output register 304 and registered as the standby mode signal, as indicated by the SYNCH_STBY going from high to low. In the present example, the SYNCH_STBY is asserted within a time period (T5) of the ASYNCH_STBY signal being asserted.

Once the SYNCH_STBY is low, the outputs of OR gates 802, 806 also go low, thus preventing the AND gate 808 from passing the SYSTEM_CLOCK signal (by the action of OR gate 802) and also preventing a subsequent high on the ASYNCH_STBY signal from immediately passing to the input (D1) the input register 302 until HALF_RST has also gone high.

Isolating the SYSTEM_CLOCK from the clock inputs to the input register 302 and the output register 304 may prevent unpredictable operation of these elements during removal the main supply of power, as the SYSTEM_CLOCK decays (as denoted by the shaded area in FIG. 9B).

The standby control circuit 800 includes a reset input signal (shown as HALF_RST) which, in this case, is generated by a counter circuit (not shown) clocked by the SYSTEM_CLOCK signal. On return of the main supply of power the counter will initiate a counting sequence terminates at a predetermined count (for example, 256, or 512). During the counting sequence the HALF_RST signal is maintained low. On termination of the count sequence, the HALF_RST signal is maintained low for a predetermined period and then released (high).

Figure 10:
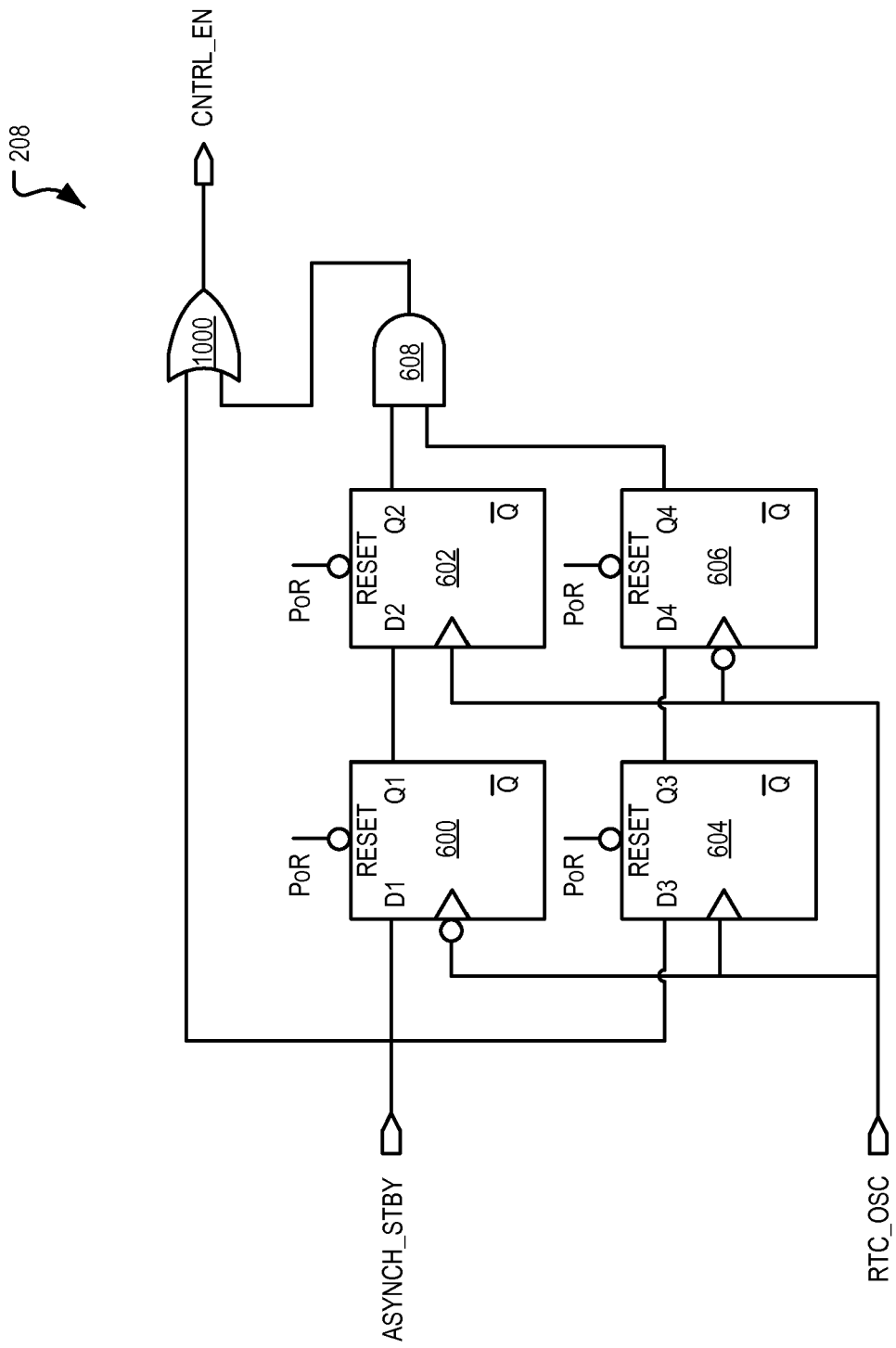
FIG. 10 is a schematic diagram of another second control circuit suitable for incorporating in the standby control circuit of FIG. 2.

Turning now to FIG. 10 there is shown an example of a circuit diagram of an embodiment of the second control circuit 208 which interfaces with a logic element 1000, which in this example is an OR gate. The circuit illustrated in FIG. 10 is substantially the same as the embodiment of the second control circuit 208 described with reference to FIG. 6. However, the inclusion of the OR gate 1000 enables the circuit illustrated in FIG. 10 to substantially immediately de-assert the CNTRL_EN signal in response to the ASYNCH_STBY signal being de-asserted (that is, going from low to high), thus preventing the second control circuit 208 from modifying the response of the first control circuit 206 to desertion of the ASYNCH_STBY signal.

Figure 11:
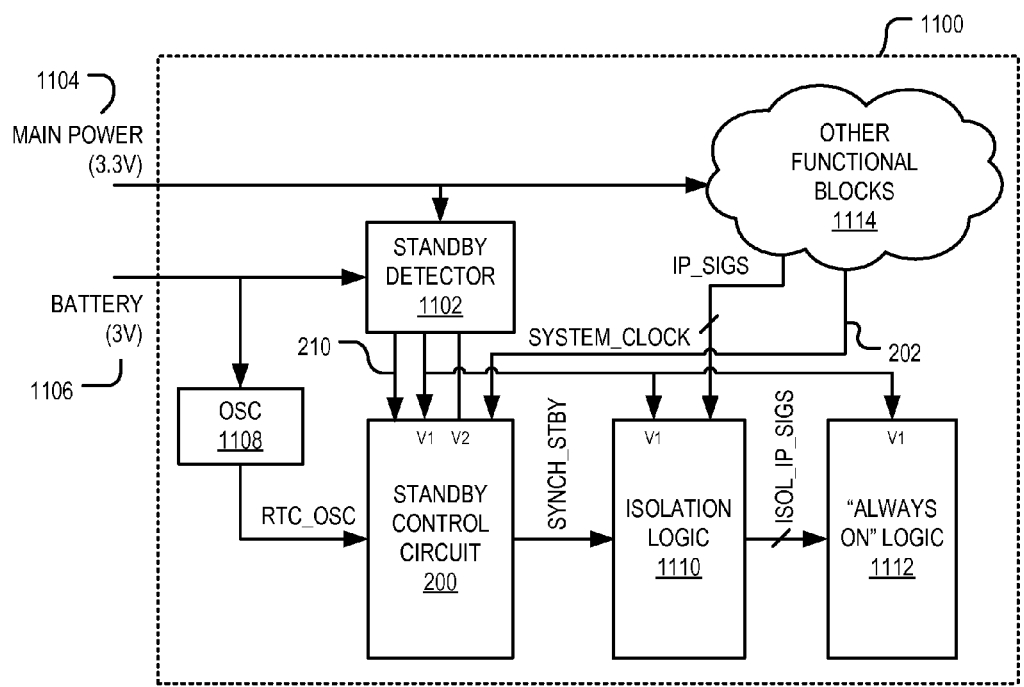
FIG. 11 is a block diagram of an integrated circuit module including a standby control circuit according an embodiment of the present invention.

Turning now to FIG. 11 there is shown a block diagram of an integrated circuit module 1100 which includes a standby control circuit 200 according to an embodiment of the present invention.

As shown, the integrated circuit module 1100 includes a standby detector 1102 for detecting the presence of a primary supply of power 1104 and for providing the ASYNCH_STBY signal accordingly. A suitable detector scheme may include, for example, a voltage regulator which accepts a 3V voltage input 1106 from a battery supply, and the 3V voltage input 1104 from the main supply of power voltage, and provides an "always on" regulated output voltage (shown as V1) to the 'always on' logic 1112 and 'isolation logic' 1110 and a switchable output voltage (shown as V2) when the primary supply of power 1104 is detected.

In this scheme, the standby detector 1102 may provide a 3.3V signal as the ASYNCH_STBY signal when the primary supply of power 1104 is present, and provide the ASYNCH_STBY signal as a 0V signal when the primary supply of power is not present.

As shown in FIG. 11, the integrated circuit module 1100 also includes an oscillator 1108 for providing the secondary clock signal, and isolation logic 1110 responsive to the standby control circuit 200 to isolate "always on" logic 1112 (such as the inputs to the RTC) in response to the detection a detection in a change in the status of the ASYNCH_STBY signal. In this respect, the combinational logic 214 shown in FIG. 2 is an example of a gate which may be included in the isolation logic 1110. In the present example, the isolation circuit 1110 gates input signals (shown as IP_SIGS) to a RTC of the "always on" logic and gates those signals with the SYNCH_STBY signal to provide isolated signals (shown as ISOL_IP_SIGS) for input to the RTC. The IP_SIGS may include, for example, the SYSTEM_CLOCK signal or a clock signal derived from the SYSTEM_CLOCK signal.

As shown, the integrated circuit module 1100 also includes other functional blocks 1114, such as a phase locked loop, which do not receive a supply of power when the primary supply is removed.

The standby control circuit of the present invention may be readily implemented on-board an integrated circuit module (i.e., on-chip).

Although in the above described embodiments the invention is implemented primarily as a SoC, in other embodiments the invention may be implemented primarily in hardware or software using, for example, hardware components such as an application specific integrated circuit (ASICs). Implementation of a hardware state machine so as to perform the functions described herein will be apparent to persons skilled in the relevant art. In other embodiments, the invention may be implemented using a combination of both hardware and software.

Finally, it is to be understood that various alterations, modifications and/or additions may be introduced into the constructions and arrangements of parts previously described without departing from the spirit or ambit of the invention.

The invention claimed is:

1. A standby control circuit for an integrated circuit module having a primary clock circuit for providing a primary clock signal which is active in a normal operating mode of the integrated circuit module and inactive in a reduced power mode of the integrated circuit module, and a secondary clock circuit for providing a secondary clock signal independently of the mode of the integrated circuit module, the standby control circuit comprising:

a first control circuit responsive, in the normal operating mode, to an asynchronous standby signal indicating a standby mode entry event to output, synchronous with the primary clock signal, a standby mode signal indicating a standby operating mode of the integrated circuit module; and a second control circuit responsive, in the reduced power mode, to the asynchronous standby signal indicating the standby mode entry event to control the first control circuit to output the standby mode signal synchronous with the secondary clock signal to indicate the standby operating mode, and wherein the first control circuit includes a first synchronizer circuit comprising at least two edge triggered registers that receive the primary clock signal as a clock input, the first synchronizer circuit has an input that receives the asynchronous standby signal, and an output for providing the standby mode signal synchronous with the primary clock signal, and wherein the first synchronizer circuit provides the standby mode signal within a first predetermined delay of the asynchronous standby signal.

2. A standby control circuit according to claim 1, wherein the first synchronizer circuit comprises oppositely edge triggered registers.

3. A standby control circuit according to claim 2, wherein the output of the first synchronizer circuit is provided by a negatively edge triggered register.

4. A standby control circuit according to claim 2, wherein the first predetermined delay is less than a decay time associated with removal of a primary supply of power, being the decay time for the output voltage of the primary supply of power to decrease from a minimum voltage representing a logic 1 state value to a maximum voltage value representing a logic 0 state.

5. A standby control circuit according to claim 1, wherein each register of the first synchronizer circuit includes an asynchronous input coupled to an output of the second control circuit to permit the second control circuit to control, in the reduced power mode, the first control circuit to output the standby mode signal.

6. A standby control circuit according to claim 1, wherein the second control circuit includes at least one additional synchronizer circuit, each additional synchronizer circuit comprising at least two edge triggered registers receiving the secondary clock signal as a clock input, each additional synchronizer circuit having an input for receiving the asynchronous standby signal, and an output for providing, responsive to the asynchronous standby signal indicating the standby mode entry event, an output signal synchronous with the secondary clock signal, the additional synchronizer circuits being arranged so that one of the additional synchronizer circuits provides its output within a second predetermined delay of the asynchronous standby signal indicating the standby mode entry event.

7. A standby control circuit according to claim 6, wherein the second predetermined delay is greater than the first predetermined delay.

8. A standby control circuit according to claim 7, wherein the second predetermined delay is greater than the first predetermined delay by a time period equivalent to no less than two clock cycles of the primary clock signal.

9. A standby control circuit according to claim 7, wherein the second predetermined delay is greater than the first predetermined delay by a time period which provides the first control circuit with sufficient time to respond to the asynchronous standby signal indicating a standby mode entry event if the primary clock was active.

10. A standby control circuit according to claim 7, wherein the second predetermined delay is about 32 μS.

11. A standby control circuit according to claim 1, further including a logic circuit responsive, in the standby mode, to the asynchronous standby signal to control the first control circuit to delay a further control of the standby mode signal, the further control for indicating the normal operating mode.

12. A standby control circuit according to claim 1, wherein in the normal operating mode the first control circuit outputs the standby mode signal within a first predetermined delay of the asynchronous standby signal indicating the standby mode entry event, and wherein in the reduced power mode the second control circuit controls the first control circuit to output the standby mode signal within a second predetermined delay of the asynchronous standby signal indicating the standby mode entry event, and wherein the second predetermined delay is greater than the first predetermined delay.

13. An integrated circuit module, comprising:
a first input for receiving a first output voltage supply from a primary supply of power;
a second input for receiving a second output voltage supply from a secondary supply of power;
a detector for receiving the first input and generating an asynchronous standby signal in response to the first output voltage supply being removed from the integrated circuit module, the asynchronous standby signal for indicating a standby mode entry event;
a primary clock circuit for providing a primary clock signal which is active in a normal operating mode of the integrated circuit module and inactive in a reduced power mode of the integrated circuit module;
a secondary clock circuit for providing a secondary clock signal independently of the mode of the integrated circuit module; and
a standby control circuit comprising:
a first control circuit responsive, in the normal operating mode, to the asynchronous standby to output, synchronous with the primary clock signal, a standby mode signal indicating a standby operating mode of the integrated circuit module; and
a second control circuit responsive, in the reduced power mode, to the asynchronous standby signal to control the first control circuit to output the standby mode signal synchronous with the secondary clock signal to indicate the standby operating mode.

14. An integrated circuit module according to claim 13, wherein the first control circuit includes a first synchronizer circuit comprising at least two edge triggered registers receiving the primary clock signal as a clock input,
the first synchronizer circuit having an input for receiving the asynchronous standby signal, and an output for providing the standby mode signal synchronous with the primary clock signal,
wherein the first synchronizer provides the standby mode signal within a first predetermined delay of the asynchronous standby signal indicating the standby mode entry event.

15. An integrated circuit module according to claim 14, wherein the first synchronizer circuit comprises oppositely edge triggered registers.

16. An integrated circuit module according to claim 15, wherein the output of the first synchronizer circuit is provided by a negatively edge triggered register.

17. An integrated circuit module according to claim 13, wherein in the normal operating mode the first control circuit outputs standby mode signal within a first predetermined delay of the asynchronous standby signal indicating the standby mode entry event, and wherein in the reduced power mode the second control circuit controls the first control circuit to output the standby mode signal within a second predetermined delay of the asynchronous standby signal indicating the standby mode entry event, and wherein the second predetermined delay is greater than the first predetermined delay.

* * * * *